US008127146B2

(12) United States Patent
Thom et al.

(10) Patent No.: US 8,127,146 B2
(45) Date of Patent: Feb. 28, 2012

(54) TRANSPARENT TRUST VALIDATION OF AN UNKNOWN PLATFORM

(75) Inventors: Stefan Thom, Snohomish, WA (US);
Shon Eizenhoefer, Bothell, WA (US);
Erik Holt, Redmond, WA (US); Yash Ashok Kumar Gandhi, Ramdaspeth Nagpur (IN)

(73) Assignee: Microsoft Corporation, Redmond, WA (US)

( * ) Notice: Subject to any disclaimer, the term of this patent is extended or adjusted under 35 U.S.C. 154(b) by 626 days.

(21) Appl. No.: 12/241,496

(22) Filed: Sep. 30, 2008

(65) Prior Publication Data

US 2010/0082987 A1   Apr. 1, 2010

(51) Int. Cl.
*H04L 9/00* (2006.01)
(52) U.S. Cl. ............................................ 713/189; 713/2
(58) Field of Classification Search .................. 713/189, 713/2
See application file for complete search history.

(56) References Cited

U.S. PATENT DOCUMENTS

| | | | |
|---|---|---|---|
| 6,988,250 B1 | 1/2006 | Proudler et al. | |
| 7,263,720 B2 | 8/2007 | Silvester | |
| 7,313,690 B2 | 12/2007 | Miller | |
| 7,318,150 B2 | 1/2008 | Zimmer et al. | |
| 2006/0005254 A1* | 1/2006 | Ross | 726/27 |
| 2006/0010326 A1 | 1/2006 | Bade et al. | |
| 2006/0047944 A1* | 3/2006 | Kilian-Kehr | 713/2 |
| 2006/0242428 A1 | 10/2006 | Tarkkala | |
| 2008/0046581 A1 | 2/2008 | Molina et al. | |
| 2008/0077993 A1 | 3/2008 | Zimmer et al. | |
| 2008/0144144 A1* | 6/2008 | Smithson | 358/520 |

FOREIGN PATENT DOCUMENTS

| | | |
|---|---|---|
| EP | 1879321 A1 | 1/2008 |
| WO | 2007097700 A2 | 8/2007 |

OTHER PUBLICATIONS

"BitLocker Drive Encryption: Scenarios, User Experience, and Flow," May 16, 2006.*
Maruyama, "Trusted Platform on Demand," Feb. 2004.*
"Trusted Mobile Platform Hardware Architecture Description—Revision 1.0", Retrieved at <<http://xml.coverpages.org/TMP-HWADv10.pdf>>, Oct. 27, 2004, File Name: TMP_HWAD_rev1_00_20040405.doc, pp. 1-63.
"An Introduction to BitLocker", Retrieved at <<http://www.windowsvistaplace.com/an-introduction-to-bitlocker/windows-vista>>, Apr. 23, 2008, pp. 1-8.
"Trusted Platform Modules Strengthen User and Platform Authenticity", Retrieved at<<https://www.trustedcomputinggroup.org/specs/TPM/Whitepaper_TPMs_Strengthen_User_and_Platform_Authenticity_Final_1_0.pdf>>, Jan. 2005, pp. 1-8.

* cited by examiner

*Primary Examiner* — Krista Zele
*Assistant Examiner* — Andrew Georgandellis

(57) ABSTRACT

A transparent trust validation of an unknown platform can be performed by communicationally coupling it to a trusted device, such as a portable peripheral device carried by a user, or one or more remote computing devices. Information from the unknown platform can be obtained by boot code copied to it from the trusted device and such information can be validated by the trusted device. The trusted device can then provide an encrypted version of decryption key to the boot code which can request the Trusted Platform Module (TPM) of the unknown platform to decrypt and return the decryption key. If the information originally obtained from the unknown platform and validated by the trusted device was authentic, the TPM will be able to provide the decryption key to the boot code, enabling it to decrypt an encrypted volume comprising applications, operating systems or other components.

19 Claims, 8 Drawing Sheets

TRANSPARENT TRUST VALIDATION OF AN UNKNOWN PLATFORM

BACKGROUND

The process of booting a computing device prepares the computing device to perform useful tasks under control of an operating system. The initial application of power to the electronic circuitry of a computing device generally only renders the computing device capable of performing rudimentary tasks, such as fetching instructions embedded into hardware components of the computing device. Thus, the boot process executes those instructions, and initiates processes that enable a computing device to perform more complex tasks. However, because the boot process performs operations prior to the execution of the operating system and any other software whose execution utilizes the operating system, malicious code executed during the boot process can remain undetected but can affect the ongoing execution properties of the system.

To provide protection against malicious code introduced into a computing device before the operating system or other software is loaded, the notion of a "trusted computer" was developed whereby the state of the computing device could be ascertained by subsequently executed software. To that end, a "Trusted Platform Module" (TPM) chip was added to the computing device, which could maintain values in a secure manner and, could be used to ascertain if the computer had booted properly. In particular, the TPM chip comprises registers known as "Platform Configuration Registers" (PCRs) that store values that uniquely identify measurements of the system that have been taken since power was applied to the circuitry of the computing device. These measurements are indicative of the software that is executed during the boot process and of the presence and configuration of various hardware components. If the proper measurements were made in the correct order, then the PCRs of the TPM would contain unique values that could be used to verify that the computing device did indeed boot in a recognizable way. If the measurements are recognized to represent a computer that has booted in a trusted way, then the machine is in a trusted state when it begins executing the operating system software. In such a manner, malicious code in the boot sequence can be detected.

However, such a basic notion of a "trusted computer" is based on an assumption that the computing device to be protected is the user's own computing device, or is within the control of the user or someone the user trusts. An unknown computing device, such as a computing device at an internet café or at an airport kiosk cannot be trusted by a user merely because the PCRs of a TPM present within such a computing device match expected values. As an initial matter, without maintaining some element of control over the physical computing device itself, the user cannot be certain that the TPM itself has not been tampered with. Secondly, the user, using such a computing device for the first time, cannot be certain of what values of the PCRs are appropriate for such a computing device. Consequently, users are often cautioned against performing computing tasks directed towards sensitive or secure information with a public, or otherwise unknown, computing device.

To enable remote verification of unknown computing devices, such as within the context of joining a protected network, a computing device guarding the network can request, and receive, information from the unknown computing device that can enable the guarding computing device to ascertain the trustworthiness of the unknown computing device. In particular, each TPM can comprise an "endorsement key" that can be a standard RSA key having both public (EKpublic) and private (EKprivate) portions. The owner of the computing device can create an endorsement key certificate (EKcertificate) over EKpublic, that can include information about the computing device, such as its manufacturer, its model designation, and the like. The indicated manufacturer, or downstream signing authority, can act as a root of trust anchor that can enable the creation of a trust relationship between the unknown computing device and a guardian computing device, or another computing device acting as a proxy for the guardian computing device, such as a trusted Privacy Certificate Authority (PCA).

To establish such a trust relationship, a process on the unknown computing device seeking to establish the trust relationship can request the TPM on that computing device to create an Attestation Identity Key (AIK), which can also be a standard RSA key. The TPM can create the AIK, but can not let the requesting process use it until, for example, a trust relationship has been established with a PCA. Instead, the TPM can provide, to the requesting process, a bundle of data, often referred to as a "data blob", comprising the public key of the AIK (AIKpublic) and a nonce to guard against spoofing, all of which can be signed by the private key of the AIK (AIKprivate). The requesting process can provide this data blob to the PCA, together with the EKcertificate, and can request validation by the PCA. If the EKcertificate has been signed by an entity that the PCA trusts, or if the EKpublic contained in the EKcertificate is an EKpublic that the PCA recognizes as originating from an authentic TPM, the PCA can certify the AIK by issuing a certificate (AIKcertificate). Because the AIKcertificate can be quite large, the PCA can encrypt it using a symmetric key, thereby generating a smaller representation of it. The PCA can also generate a digest of AIKpublic and encrypt all of that with EKpublic. The resulting data blob is commonly referred to as the "EK activation blob."

The PCA can return the EK activation blob to the requesting process on the unknown computing device. The requesting process can, in turn, provide the EK activation blob to the TPM on the untrusted computing device, and request that the TPM unlock the identity associated with the AIK. If the TPM can decrypt the EK activation blob, which it should be able to do, since it should be in possession of EKprivate, then the TPM can check the digest of AIKpublic that was created by the PCA against the symmetric key that was used. If the digest received matches the digest as determined by the TPM, the TPM can provide the symmetric key to the requesting process, which can then, in turn, decrypt the AIKcertificate. With the AIK certificate, the requesting process on the unknown computing device can establish a trust relationship with another computing device, such as a guardian computing device, that trusts the PCA. The unknown computing device can, thereby, become a trusted computing device.

Unfortunately, a user seeking to use an untrusted computing device, such as a public kiosk or a computing device at an internet café, may not be able to establish independent communication with a certifying authority and may not, therefore, be able to avail themselves of the above described mechanisms. Consequently, such a user still cannot use the unknown, and untrusted, computing device for any manner of secure computation.

SUMMARY

The process by which an Attestation Identity Key (AIK) is certified can be performed, not with a Privacy Certificate Authority (PCA), but rather with a trusted device that the user can carry with them, or can otherwise communicationally couple with the untrusted computing device. The trusted device can comprise an encrypted volume, a decryption key for the encrypted volume, and processing and information sufficient to establish a trust relationship with an unknown computing device. Utilizing the infrastructure by which an AIK is certified, the trusted device can provide, to the unknown computing device, the decryption key for the encrypted volume in such a manner that the decryption key can be utilized to decrypt the encrypted volume only if the unknown computing device is found to be trustworthy.

Consequently, in one embodiment, the trusted device can comprise an encrypted volume comprising computer-readable instructions and data that the user seeks to utilize on the unknown computing device, a decryption key for the encrypted volume, processing capability sufficient to perform determinations with respect to the unknown computing device and sufficient to perform relevant encryptions and decryptions, data that can be utilized by the processing capability to perform determinations with respect to the unknown computing device, and computer-executable instructions, or "boot code", that can boot the unknown computing device.

In another embodiment, the boot code can provide, to the trusted device, information sufficient to enable the trusted device to make trust determinations with respect to the unknown computing device. Such information can comprise an event log comprising indications of each element executed, or otherwise activated, on the unknown computing device since it was booted, and such information can further comprise the public version of the Endorsement Key (EKpublic) of the Trusted Platform Module (TPM) of the unknown computing device.

In a further embodiment, the trusted device can examine the event log provided by the boot code to determine the trustworthiness of elements executed or activated on the unknown computing device. To aid the trusted device in performing such a determination, the trusted device can comprise a listing of known trusted elements, a listing of known untrusted, or malicious, elements, or a combination thereof. Additionally, the trusted device can examine the EKpublic to determine if it is signed by root signing authority known to the trusted device, or is otherwise an EKpublic that the trusted device recognizes as originating from an authentic TPM.

In a still further embodiment, the trusted device can provide the decryption key to the boot code within an encrypted set of data that the boot code can, in turn, provide to the TPM on the unknown computing device. The TPM on the unknown computing device can then provide the decryption key to the boot code if it can decrypt the set of data and if the Platform Configuration Register (PCR) values maintained by the TPM match those expected by the trusted device based on the event log, as provided to the trusted device by the boot code.

In a yet further embodiment, the boot code, after receiving the decryption key from the TPM of the unknown computing device, can poll the user as to the user's intentions with respect to the unknown computing device. If the user indicates that they may return to the unknown computing device, the boot code can cause the decryption key to be sealed by the TPM of the unknown computing device, and the sealed decryption key can be stored, by the boot code, back on the trusted device.

In other embodiments, the trusted device can be a server computing device communicationally coupled to the unknown computing device, a portable storage device communicationally coupled to the unknown computing device, or another like device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
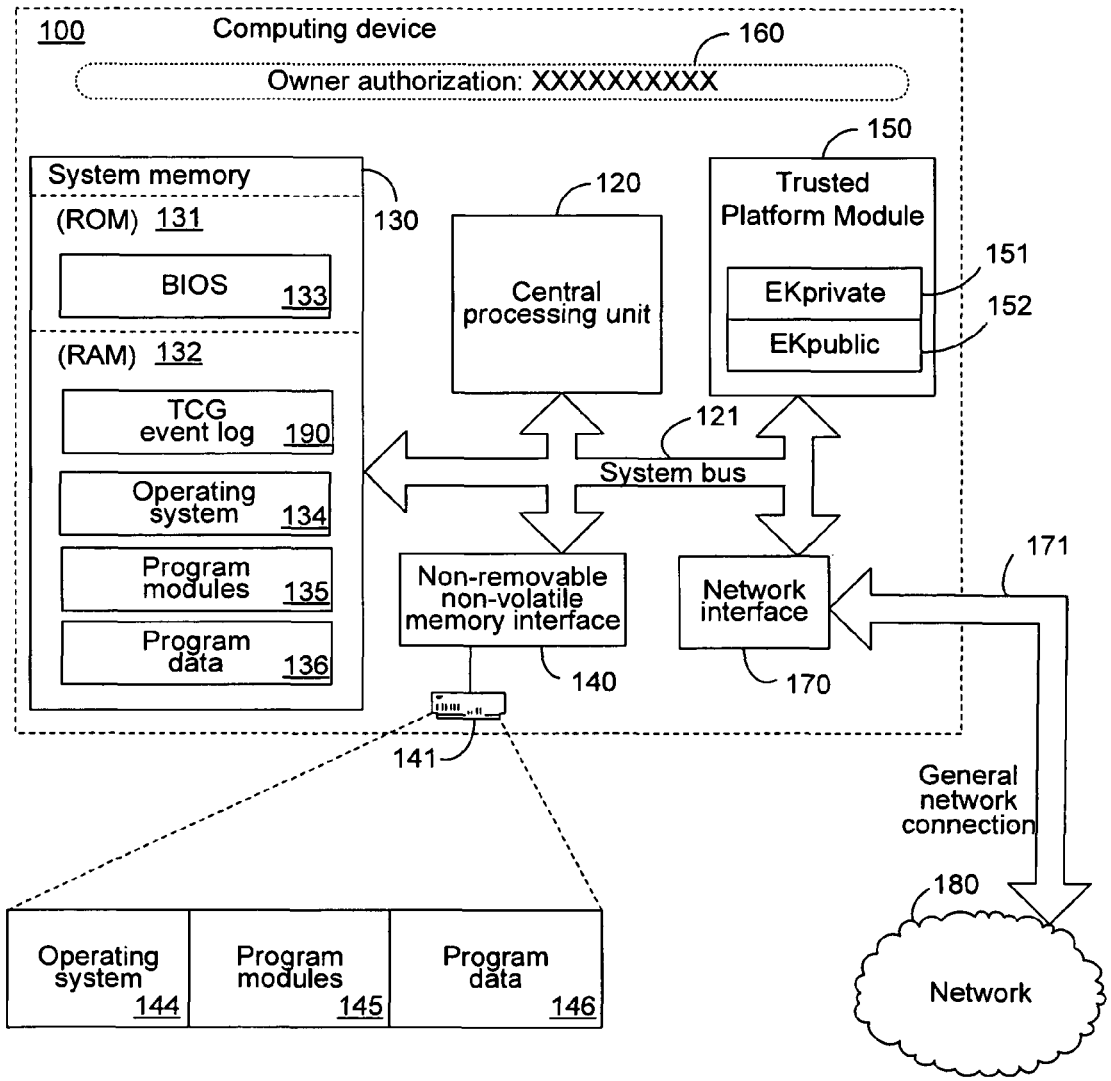
FIG. 1 is a diagram of an exemplary computing device comprising elements for enabling a trust validation despite being previously unknown.

The following description relates to establishing a trust validation of an unknown platform or computing device, and thereby enabling a user to securely utilize the platform or computing device. In one embodiment, such a trust validation can be performed by a secure device, which can be a device that the user physically carries with them, such as a portable storage device, or which can also be a device that the user communicationally couples to the unknown computing device, such as a server computing device. The secure device can comprise computer-executable instructions that can boot the unknown computing device and can provide, to the secure device, information from the unknown computing device to enable the secure device to make one or more trust determinations regarding the unknown computing device. Subsequently, the secure device, which can also comprise an encrypted volume, and an associated decryption key, can provide the decryption key to the unknown computing device in such a manner that the Trusted Platform Module (TPM) of the unknown computing device will unlock the decryption key and provide it to the boot code, to enable decryption of the encrypted volume, if a trust relationship has been established.

The techniques described herein make reference to specific types of encryption and decryption keys, such as Endorsement Keys and Attestation Identity Keys, and specific types of hardware, such as the TPM. Such references, however, are provided only to utilize the existing knowledge of those skilled in the art with respect to such items, thereby simplifying the below description. Such references are not intended to limit the techniques described to the specifically enumerated elements. Therefore, the terms "Endorsement Key", "Attestation Identity Key", "Trusted Platform Module" and the like are meant to encompass any mechanism which provides for the relevant functionality, and not only those mechanisms that meet the strict definitions of those terms that are set forth by the relevant standards setting groups.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary computing device 100 is illustrated, comprising, in part, hardware elements referenced further in the methods described below. The exemplary computing device 100 can include, but is not limited to, one or more central processing units (CPUs) 120, a system memory 130, a Trusted Platform Module (TPM) 150, and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and the TPM 150 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The TPM 150 can provide encryption keys and store values such that they are protected by the hardware design of the TPM 150 itself. For example, the TPM 150 is illustrated as including an Endorsement Key (EK) comprising a private portion (EKprivate) 151 and a public portion (EKpublic) 152. As will be described further below, the TPM 150 can also include one or more Attestation Identity Keys (AIKs), which can likewise comprise a public portion (AIKpublic) and a private portion (AIKprivate). In addition to encryption keys, the TPM 150 can also maintain data in a secure manner and can include one or more Platform Configuration Registers (PCRs), whose values can uniquely represent the state of the computing device 100. Traditionally, only specific code executed by the CPU 120 would be permitted to send data to the TPM 150 that would modify the values stored in the PCRs.

The computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Among computer storage media, the system memory 130 comprises computer storage media in the form of volatile and/or nonvolatile memory, including Read Only Memory (ROM) 131 and Random Access Memory (RAM) 132. A Basic Input/Output System 133 (BIOS), containing, among other things, code for booting the computing device 100, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136. The RAM 132 can further contain data that can be relevant to the operation of the TPM 150, such as the TCG event log 190. In one embodiment, the TCG event log 190 can comprise a unique identification of all of the modules loaded or executed by the computing device 100 since power was applied or since it was last restated; the same modules whose loading or execution can have resulted in the values currently maintained by the TPM 150 in one or more PCRs.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

To enable a user of the computing device 100 to access specific functionality of the TPM 150, the computing device can further comprise an owner authorization 160. The owner authorization 160 is illustrated via a dashed line in FIG. 1 to signify that it is a property of the computing device 100, rather than to illustrate its location within the computing device. In one embodiment, the owner authorization 160 can be part of the BIOS 133, or can otherwise be stored within the computing device 100, such as by dedicated storage circuitry. The provision of an owner authorization that matches the owner authorization 160 can enable a user, or a requesting process operating on behalf of the user, to access specific functionality of the TPM 150, such as, for example, the ability to request that the TPM generate one or more AIKs.

Figure 2:
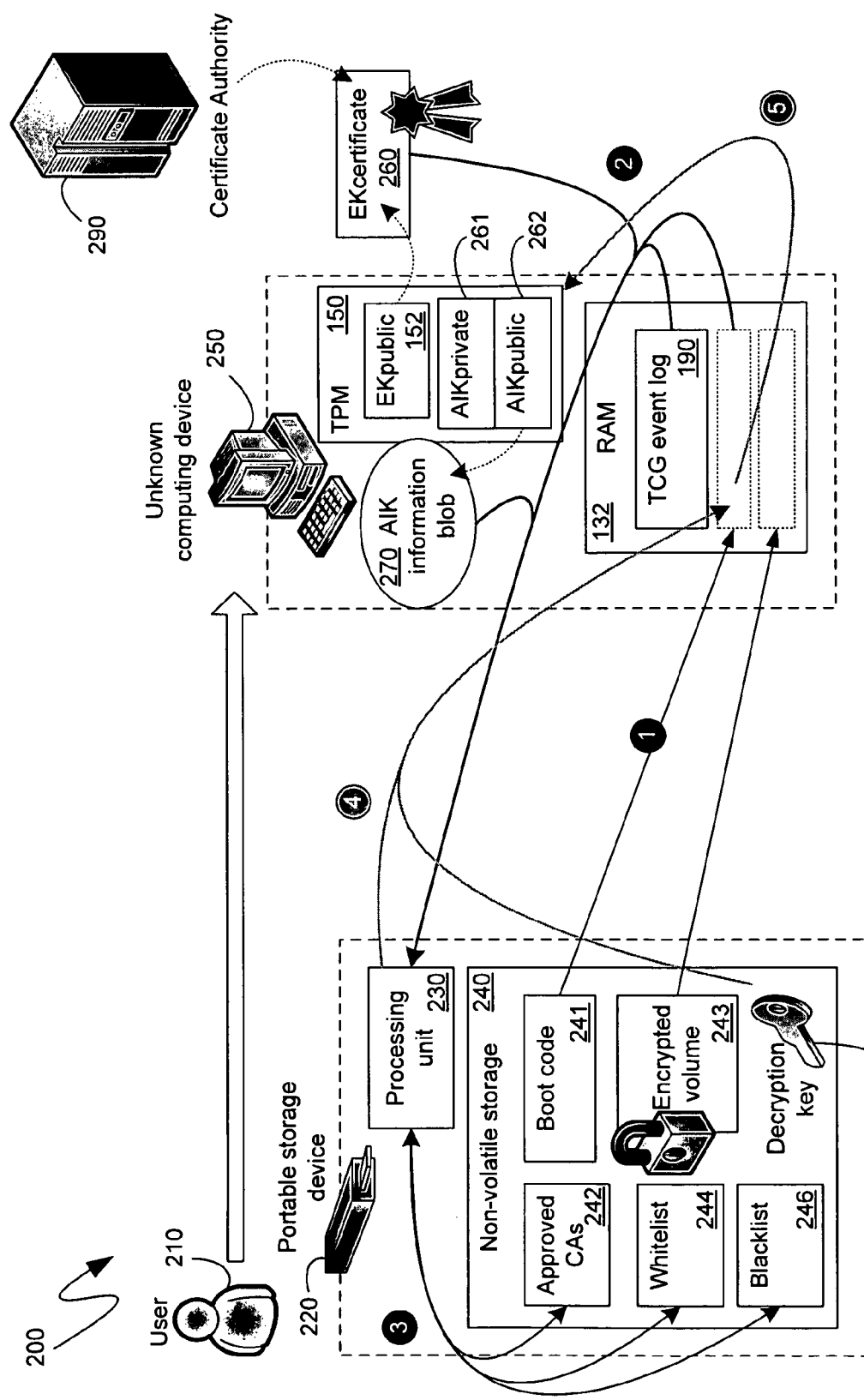
FIG. 2 is a system diagram illustrating an exemplary trust validation of an unknown platform by utilizing a portable storage device.

The operation of the components illustrated in FIG. 1 is further described with reference to FIGS. 2 through 5, which illustrate processes that can be performed to establish a trust validation of the computing device 100 of FIG. 1 when such a computing device is unknown to a user that seeks to use it in a secure manner. Turning to FIG. 2, a system diagram 200 is shown illustrating a portion of an exemplary trust validation of an unknown computing device 250 that can be performed by utilizing a portable storage device 220 and a certificate authority 290. In one embodiment, the unknown computing device 250 can be of the form of the computing device 100 illustrated in FIG. 1, and described in detail above. Consequently, to the extent that various elements and portions of the computing device 100 are illustrated in FIG. 2 as being part of the unknown computing device 250, those elements and portions are given the same identifying numbers as they were in FIG. 1.

As shown in the system 200, a user 210 seeks to utilize an unknown computing device 250. The user 210 can have with them, or can otherwise have access to, a portable storage device 220, such as a ubiquitous "USB memory stick" that can comprise a processing unit 230 and non-volatile storage 240. The processing unit 230, as will be evident from the descriptions below, need not be a standard central processing unit, such as the CPU 120 of the computing device 100 of FIG. 1. Instead, the processing unit 230 need only comprise sufficient processing capability to perform the limited tasks enumerated below, and equivalents thereof, and other incidental tasks. Therefore, the processing unit 230 can be similar to processing units already typically included within portable storage devices and, consequently, the portable storage device 220 can be a commonly used portable storage device, including portable hard disk drives, portable digital entertainment devices, such as portable audio/video players, and, of course, portable flash-based storage devices, such as the ubiquitous "USB memory stick".

Within the non-volatile storage 240 of the portable storage device 220, an encrypted volume 243 can be stored, comprising, in an encrypted form, computer-readable instructions in the form of software applications, operating systems, or other computer-executable components that the user 210 may seek to execute and utilize on the unknown computing device 250. The non-volatile storage 240 can likewise comprise a decryption key 245 that, when provided, can enable the unknown computing device 250 to decrypt the encrypted volume 243 and gain access to the software applications, operating systems and other computer-executable component stored therein.

The non-volatile storage 240 of the portable storage device 220 can also comprise boot code 241 that can include computer-executable instructions that can boot the unknown computing device 250. As will be described further below, such boot code 241 can instruct the unknown computing device 250 in an appropriate manner, thereby enabling the trust validation that is sought. The non-volatile storage 240 can further comprise information that can be utilized by the processing unit 230 of the portable storage device to make one or more decisions relevant to the trust validation of the unknown computing device 250. Such information can include a listing of approved Certificate Authorities (CAs) 242, a whitelist 244 comprising a listing of computer-executable instructions or modules that are known to be trustworthy or non-malicious, and a blacklist 246 comprising a listing of computer-executable instructions or modules that are known to be malicious.

Initially, the user 210, seeking to utilize the unknown computing device 250, can establish a communicational connection between the unknown computing device and the portable storage device 220. If the portable storage device 220 is in the form of a USB memory stick or similar peripheral device, such a communicational connection can be enabled by the user 210 physically connecting the portable storage device to the appropriate communicational or peripheral port of the unknown computing device 250. Subsequently, the user 210 can restart or power on the unknown computing device 250, which can cause the boot code 241 to be copied from the non-volatile storage 240 of the portable storage device 220 to the RAM 132 of the unknown computing device 250.

The boot code 241 can cause the unknown computing device 250 to prompt the user 210 to enter the owner authorization 160 of the unknown computing device to enable the boot code to access specific functionality of the TPM 150 of the unknown computing device. In one embodiment, such an owner authorization 160 can be provided to the user 210 when the user seeks to use the unknown computing device 250, such as through a sign posted near the unknown computing device, or as information provided by a manager of the unknown computing device 250, such as an internet café employee, or an airport kiosk administration personnel. In an alternative embodiment, the boot code 241 need cause the user 210 to be prompted for the owner authorization 160, as the owner authorization can be, in such an alternative embodiment, stored on the unknown computing device 250 itself and can, thereby, be accessible to the boot code without the user's intervention. For example, the owner authorization 160 can be stored in a well known location or a standard location from which the boot code would acquire it. Alternatively, the owner authorization 160 of a computing device, such as the unknown computing device 250, which is intended to be made available for general utilization, can have its owner authorization set to a predetermined or default value that can already be known to the boot code 241. With the owner authorization 160, the boot code 241 can request that the TPM 150 create an AIK. The boot code 241 can further request that the TPM 150 create, and provide to it, an endorsement key certificate (EKcertificate) 260. As will be known by those skilled in the art, the EKcertificate can comprise EKpublic 152 and can further be signed, either directly or indirectly, by a CA 290.

In response to the boot code's 241 requests, the TPM 150 can create an AIK comprising a public portion (AIKpublic) 262 and a private portion (AIKprivate) 261. However, as will be known to those skilled in the art, and as indicated previously, the TPM 150 may not let the requesting process, such as the boot code 241, have access to the AIK until a subsequent validation has been performed. Instead, the TPM 150 can provide to the boot code 241 an AIK data blob 270 which, as also indicated previously, can comprise the public portion of the AIK (AIKpublic) 262 and a nonce to guard against spoofing, all of which can be signed by the private key of the AIK (AIKprivate) 261. The TPM 150 can further provide to the boot code 241, in response to its requests for the same, the EKcertificate 260. In addition to the AIK data blob 270 and the EKcertificate 260, provided by the TPM 150, the boot code 241 can also obtain, from the RAM 132 of the unknown computing device 250, the TCG event log 190 which, as indicated previously, can comprise a unique identification of all of the modules loaded or executed by the unknown computing device 250 since power was applied or since it was last restated. Although not explicitly shown in FIG. 2, the TPM 150 can maintain PCRs comprising values that can be uniquely based on measurements of these same modules.

Once the boot code 241 has received the AIK data blob 270 and the EKcertificate 260, and has obtained the TCG event log 190, it can, as indicated in FIG. 2, send those to the portable storage device 220 for evaluation by the processing unit 230. In evaluating the AIK data blob, the EKcertificate 260 and the TCG event log 190, the processing unit 230 can reference the database of approved CAs 242, the whitelist 244 and the blacklist 246, which can be stored on the portable storage device 220. For example, the processing unit 230 can initially evaluate the EKcertificate 260 to determine if it trusts the TPM 150 indicated to be on the unknown computing device 250 by, in one embodiment, referencing the database of approved CAs 242 to determine if the EKcertificate has been signed, either directly or indirectly, by a CA that is listed in the database of approved CAs. Similarly, the processing unit can evaluate the TCG event log 190 to determine if it trusts everything that is indicated to have been executed or utilized on the unknown computing device 250 by, in one embodiment, referencing the whitelist 244, the blacklist 246, or some combination thereof. For example, in one embodiment, the processing unit 230 can determine that the unknown computing device 250 should be in a trustworthy state if no code or component from the blacklist 246, comprising known malicious or untrustworthy items, was executed or utilized by the unknown computing device 250 since it was booted, as indicated by the TCG event log 190. In another embodiment, however, the processing unit 230 can determine that the unknown computing device 250 should be in a trustworthy state if, not only was no code or component from the blacklist 246 executed or utilized, but also if the only code or components executed or utilized by the unknown computing device since it was booted, as indicated by the TCG event log 190, are specifically enumerated in the whitelist 244.

Once the processing unit 230 has ascertained that the unknown computing device 250 should be in a trusted state, and should comprise a trusted TPM, it can provide, to the unknown computing device the decryption key 245. However, because the TCG event log 190 may have been tampered with, the decryption key 245 can be provided in such a manner that it can only be accessed on the unknown computing device 250 if the values contained in the PCRs of the TPM 150 match the expected values of those PCRs given the executed or utilized code and components of the TCG event log 190. Because the TPM 150 has been found by the processing unit 230 to be trustworthy, at least in part because of the EKcertificate 260, the processing unit can provide the decryption key 245 to the TPM and request that the TPM not provide the decryption key to any requesting process on the unknown computing device 250 unless the PCR values maintained by the TPM match the values that the processing unit expects them to be.

In particular, the processing unit 230 can encrypt, with EKpublic 152, which it can obtain from the provided EKcertificate 260, the decryption key 245, the values of the PCRs as the processing unit expects them to be based on the data contained in the provided TCG event log 190, and AIKpublic 262. In one embodiment, because the expected values of the PCRs can be quite large, efficiencies can be realized by utilizing a digest of those values, rather than the values themselves. Similarly, because AIKpublic 262 can also be quite large, additional efficiencies can be realized by utilizing a digest of AIKpublic. The processing unit can then, as illustrated in FIG. 2, send the decryption key 245, the digests of the expected PCR values, and the digest of AIKpublic 262, all encrypted with EKpublic 152, to the boot code 241 executing in RAM 132 of the unknown computing device 250. The boot code 241 can subsequently, as also illustrated in FIG. 2, provide the received encrypted bundle, to the TPM 150 and request that the TPM decrypt it and return, to the boot code, the decryption key 245.

As will be known by those skilled in the art, the encrypted bundle sent by the processing unit 230 can be analogous to an EK activation blob and the TPM 150 can respond in an analogous manner. Put differently, the TPM 150 can be any standard TPM and need not comprise any specific code or capability for interoperation with the mechanisms described herein.

Upon receipt of the encrypted bundle from the boot code 241, executing in RAM 132, the TPM 150 will attempt to decrypt it using AIKprivate 261. If the TPM 150 can decrypt it, then, as will be known by those skilled in the art, the TPM 150 can be verified to be the TPM that is associated with the EKcertificate 260 that was provided to the processing unit 230 and which was verified by the processing unit. Consequently, the trust that the processing unit 230 had extended to the TPM that should be part of the unknown computing device 250 can now be extended to the precise TPM 150 that actually is part of the unknown computing device.

Subsequently, after the TPM 150 has decrypted the encrypted package originally provided by the processing unit 230, it can proceed to verify that the TCG event log 190 that the processing unit 230 received was, in fact, accurate. In particular, the TPM 150 can compare the expected PCR values, which were determined by the processing unit based on the received TCG event log 190, and which were included within the encrypted package, as indicated previously, with the actual PCR values as maintained by the TPM during the boot of the unknown computing device 250. If the actual PCR values match the expected PCR values, the TPM 150 can determine that the processing unit 230 had been provided a correct TCG event log 190 and, consequently, that the processing unit can have made an accurate trust determination based on such a log. The TPM 150 can, thereafter, provide the decryption key 245 to the requesting boot code 241 executing in RAM 132.

After the boot code 241 obtains the decryption key 245 from the TPM 150, it can decrypt the encrypted volume 243. In one embodiment, the encrypted volume 243 can be copied to the unknown computing device 250, such as to the RAM 132 of the unknown computing device, at any time. In another embodiment, because the encrypted volume 243 can be rather large, it can be copied concurrently with the above described communications. In particular, copying of the encrypted volume 243 from the portable storage device 220 to the unknown computing device 250 can commence as soon as the two are communicationally coupled together, or anytime thereafter sufficiently in advance of the receipt of the decryption key 245 by the boot code 241 such that the encrypted volume can be completely copied, or subsequently copied, by the time the boot code receives the decryption key, thereby minimizing inefficiency.

Once the encrypted volume 243 is copied to the unknown computing device 250, and once the boot code 241 obtains the decryption key 245 from the TPM 150, the boot code can decrypt the encrypted volume, thereby enabling the software applications, operating systems or other components that are stored on the formerly encrypted volume 243 to be executed on the unknown computing device 250. Because the software applications, operating systems and other components cannot be executed until they are decrypted, and because they can only be decrypted if the above trust-based mechanisms verify that the unknown computing device 250 can be validated, the software applications, operating systems and other components present on the formerly encrypted volume 243 can be executed without trust-based concerns associated with the unknown computing device.

Figure 3:
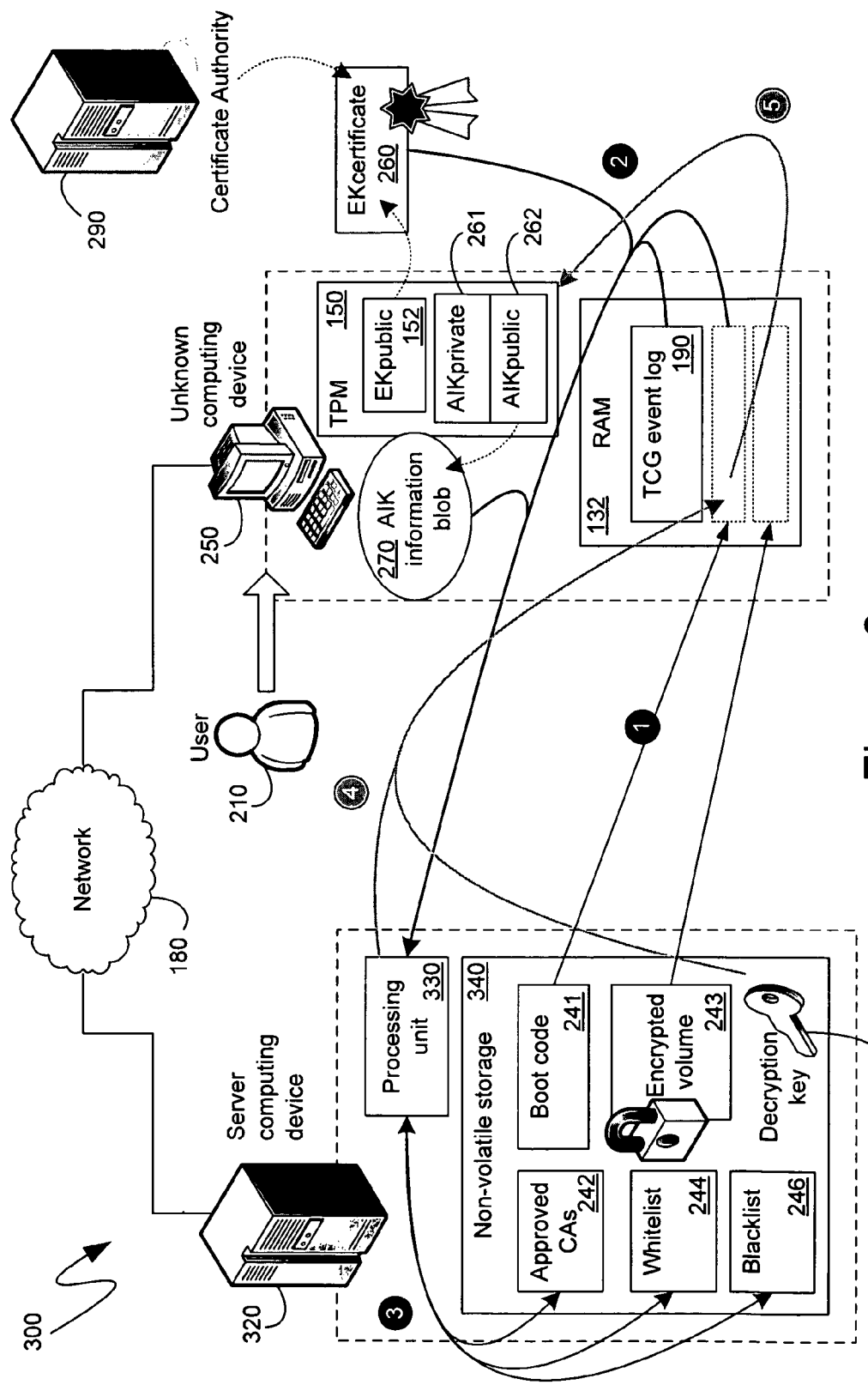
FIG. 3 is a system diagram illustrating an exemplary trust validation of an unknown platform by utilizing a server computing device.

In another embodiment, rather than carrying with them a portable storage device, such as the portable storage device 220 of FIG. 2, described in detail above, the user 210 can avail themselves of the above described mechanisms via another computing device to which the unknown computing device 250 can be communicationally coupled. Turning to FIG. 3, a series of communications analogous to those illustrated in FIG. 2 is shown. Specifically, the system diagram 300 of FIG. 3 can be analogous to the system diagram 200 of FIG. 2, except that at least some of the features and functionality of the portable storage device 220, described in detail above, can be replaced by the server computing device 320. Consequently, for ease of reference between them, like elements between the system diagram 200 and the system diagram 300 carry like identification numbers. Thus, the elements contained within the non-volatile storage 340 of the server computing device 320 can, in one embodiment, be identical to the elements, described in detail above, contained within the non-volatile storage 240 of the portable storage device 220, including, for example, the boot code 241, the encrypted volume 243, the decryption key 245, the database of approved CAs 242, the whitelist 244 and the blacklist 246. In one embodiment, however, because the server computing device 320 can be communicationally coupled to a network 180, a communicational coupling that may not be feasible for the portable storage device 220, one or more of the elements shown as being stored within the non-volatile storage 340 of the server computing device can be stored on one or more other storage device or computing device that can, likewise, be communicationally coupled to the network 180. Similarly, one or more of the elements shown as being stored within the non-volatile storage 340 of the server computing device 320 can be updated or supplemented with information stored on one or more other storage device or computing device that are communicationally coupled to the network 180.

In addition to the non-volatile storage 340, the server computing device 320 can further comprise one or more processing units 330. Unlike the processing unit 230 of the portable storage device 220, the processing unit 330 of the server computing device 320 can be a full-fledged processing unit, such as the CPU 120 of FIG. 1. Nevertheless, as with the processing unit 230, the only functionality required of the processing unit 330 is the ability to perform the relevant functions of the above-described mechanisms, such as the evaluation of the information provided, from the unknown computing device 250, by the boot code 241.

As with FIG. 2, a user 210 seeking to use an unknown computing device 250 can initially establish communication between the unknown computing device 250 and the server computing device 320, such as through the network 180. In one embodiment, such a communicational coupling can be established through a web site, or similar user-friendly front-end that can be hosted by the server computing device 320 or an associated computing device. Once the communicational coupling between the server computing device 320 and the unknown computing device 250 has been established, processing and communication can proceed in the manner described in detail above. Specifically, boot code 241 and the encrypted volume 243 can be copied to the unknown computing device 250, the boot code can request the above-enumerated information from the unknown computing device and can provide it to the server computing device 320. Subsequently, the server computing device 320 can evaluate the provided information, such as with reference to one or more of the database of approved CAs 242, the whitelist 244 and the blacklist 246, in the manner described above, and can also, as also described above, provide an encrypted package back to the boot code 241 executing on the unknown computing device 250, which the boot code can provide to the TPM 150. The TPM 150 can, in the manner described above, decrypt the encrypted package and can, thereby, provide to the boot code 241, the decryption key 245, enabling the boot code to decrypt the encrypted volume 243 on the unknown computing device 250 and provide access to the software applications, operating systems and other components contained therein to the user 210.

Figure 4A:
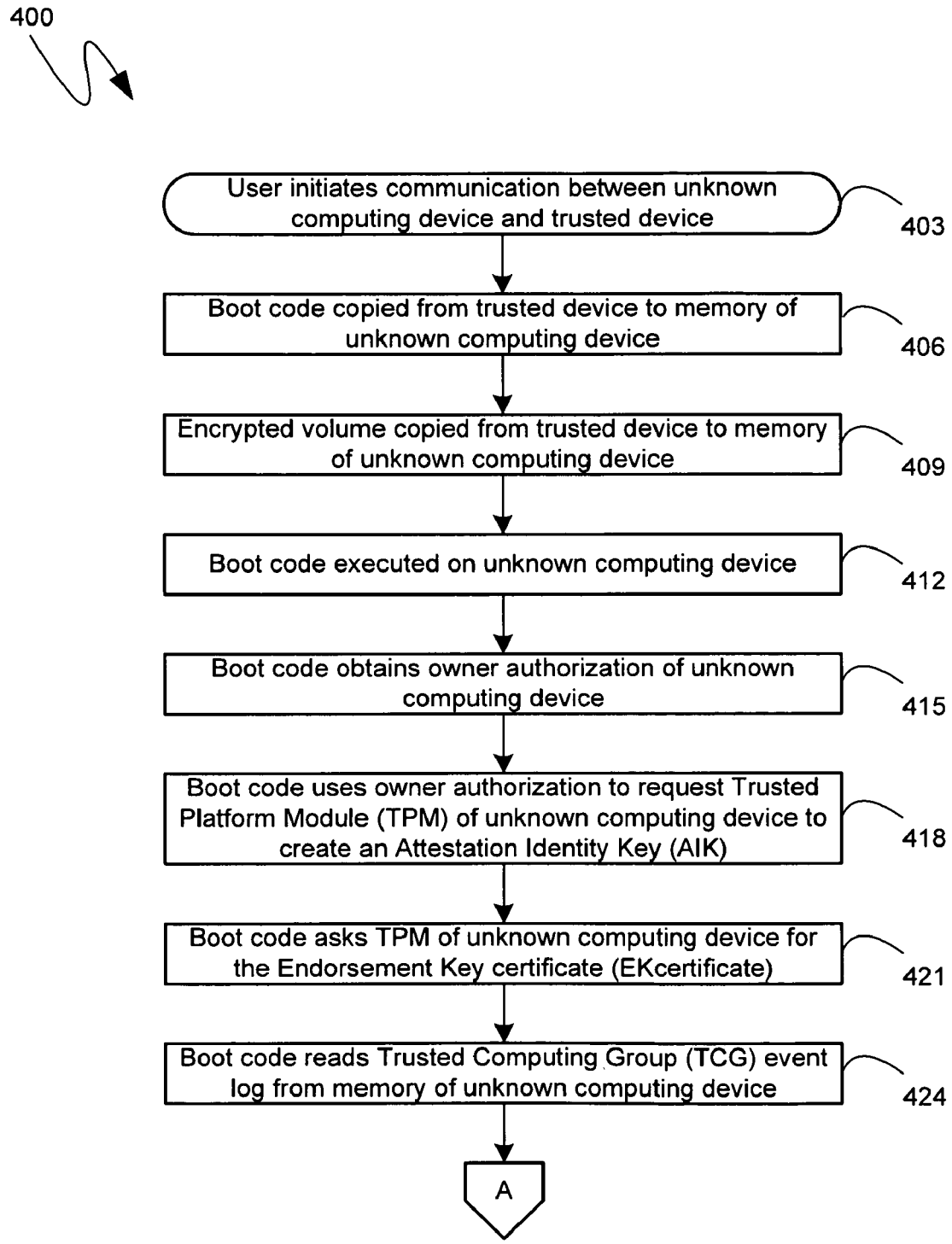
FIGS. 4a, 4b, 4c and 4d are a flow diagram of an exemplary trust validation of an unknown platform.

Additional detail regarding the above described mechanisms is provided with reference to flow diagram 400, which stretches across FIGS. 4a, 4b, 4c and 4d and comprises steps 403 through 496. The steps of flow diagram 400 can commence with step 403, as shown in FIG. 4a, when a user seeking to utilize an unknown, and as yet untrusted, computing device, such as the unknown computing device 250, initiates communication between that unknown computing device and a "trusted device." As used hereinafter, the term "trusted device" is defined to be a device, such as the portable storage device 220, the server computing device 320, or any combination of devices or peripherals, that can provide the functionality that was described in detail above as being provided by the portable storage device or the server computing device.

Once the user establishes communication between the unknown computing device and a trusted device at step 403, subsequently, at steps 406 and 409, respectively, the boot code and the encrypted volume can be copied from the trusted device to the unknown computing device. As indicated previously, the precise timing of the copying of the encrypted volume at step 409 can be varied and need not occur at the time illustrated, though, for efficiency purposes, the copying of the encrypted volume can be initiated sufficiently in advance of the receipt of the decryption key 245 by the boot code 241 to avoid unnecessary delay.

After the boot code, such as boot code 241, has been copied to the unknown computing device at step 406, it can be executed at step 412. The execution of the boot code at step 412 can prompt the user 210 for the owner authorization of the unknown computing device at step 415 or can otherwise itself obtain the owner authorization, such as from a known or predetermined storage location on the unknown computing device or by utilizing a known or predetermined owner authorization value. Once the boot code obtains the correct owner authorization, through any of the alternatives described in detail previously, the boot code can, at step 418, utilize the owner authorization to request the TPM of the unknown computing device, such as the TPM 150, to create an AIK. The boot code can also, at step 421, request that the TPM of the unknown computing device provide to it the EKcertificate and it can, at step 424, obtain a TCG event log, such as the TCG event log 190, from the unknown computing device. As with steps 406 and 409, steps 418, 421 and 424 need not occur in the illustrated order amongst themselves and are illustrated as such strictly for simplicity of presentation. As will be recognized by those skilled in the art, steps 412, 421 and 424 can be performed in parallel, or in any order amongst themselves.

Figure 4B:
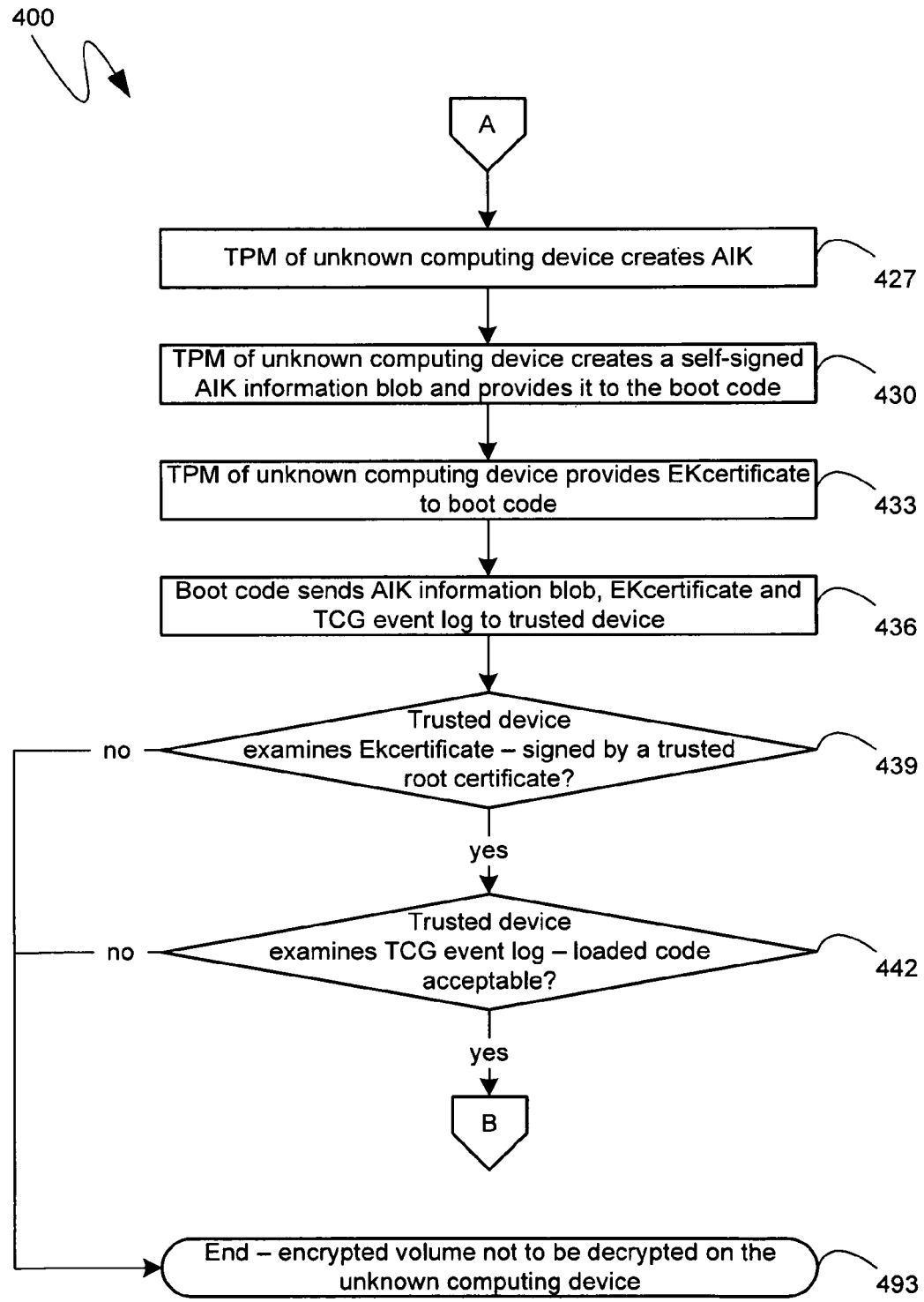

Continuing on to FIG. 4b, in response to the requests at steps 418 and 421 from the boot code, the TPM of the unknown computing device can create an AIK at step 427 and can subsequently provide a self-signed AIK information blob to the boot code at step 430. As will be known by those skilled in the art, and as indicated previously, the AIK information blob can comprise the public version of the AIK, such as AIKpublic 262, and a nonce to prevent spoofing, all of which can be signed by the private version of the AIK, such as AIKprivate 261. The TPM of the unknown computing device can also provide, in response to its request for the same, an EKcertificate to the boot code at step 433. As before, step 433 need not occur after steps 427 and 430 and can, instead, occur prior to them or concurrently with them.

Upon collecting the information obtained or received at step 424, 430 and 433, the boot code can, at step 436, send the AIK information blob, the EKcertificate and the TCG event log to the trusted device. Upon receipt of the information, the trusted device can initially examine the EKcertificate, at step 439, to determine if the certificate is signed, either directly or indirectly, by a CA that the trusted device recognizes. If the EKcertificate is found, at step 439, to not comprise such a trusted root certificate, then, at step 493, the processing of flow diagram 400 can terminate with a determination that the encrypted volume should not be decrypted on the unknown computing device, thereby denying the user's access, via the unknown computing device, to the software applications, operating systems and other components contained therein.

However, if the trusted device determines that the EKcertificate was signed by a trusted root, processing can proceed to step 442, wherein the trusted device can examine the provided TCG event log to determine if the instructions executed on the unknown computing device, and the modules loaded thereon, are acceptable. As indicated previously, such a determination can reference a whitelist, such as the whitelist 244, a blacklist, such as the blacklist 246, or some combination thereof. For example, the determination at step 442 can find that the instructions or modules executed or loaded on the unknown computing device are acceptable if none of the modules listed in the TCG event log are contained in the blacklist. Alternatively, the determination at step 442 can find that the instructions or modules executed or loaded on the unknown computing device are acceptable if all of the modules listed in the TCG event log are contained in the whitelist.

Irrespective of the precise qualifications for finding that the instructions or modules executed or loaded on the unknown computing device are acceptable, if the determination, at step 442, finds that they are not acceptable, processing can end at step 493 with a determination that the encrypted volume is not to be decrypted on the unknown computing device. However, if the determination at step 442 finds that the instructions or modules executed or loaded on the unknown computing device are acceptable, processing can proceed with step 445 of FIG. 4c.

Figure 4C:
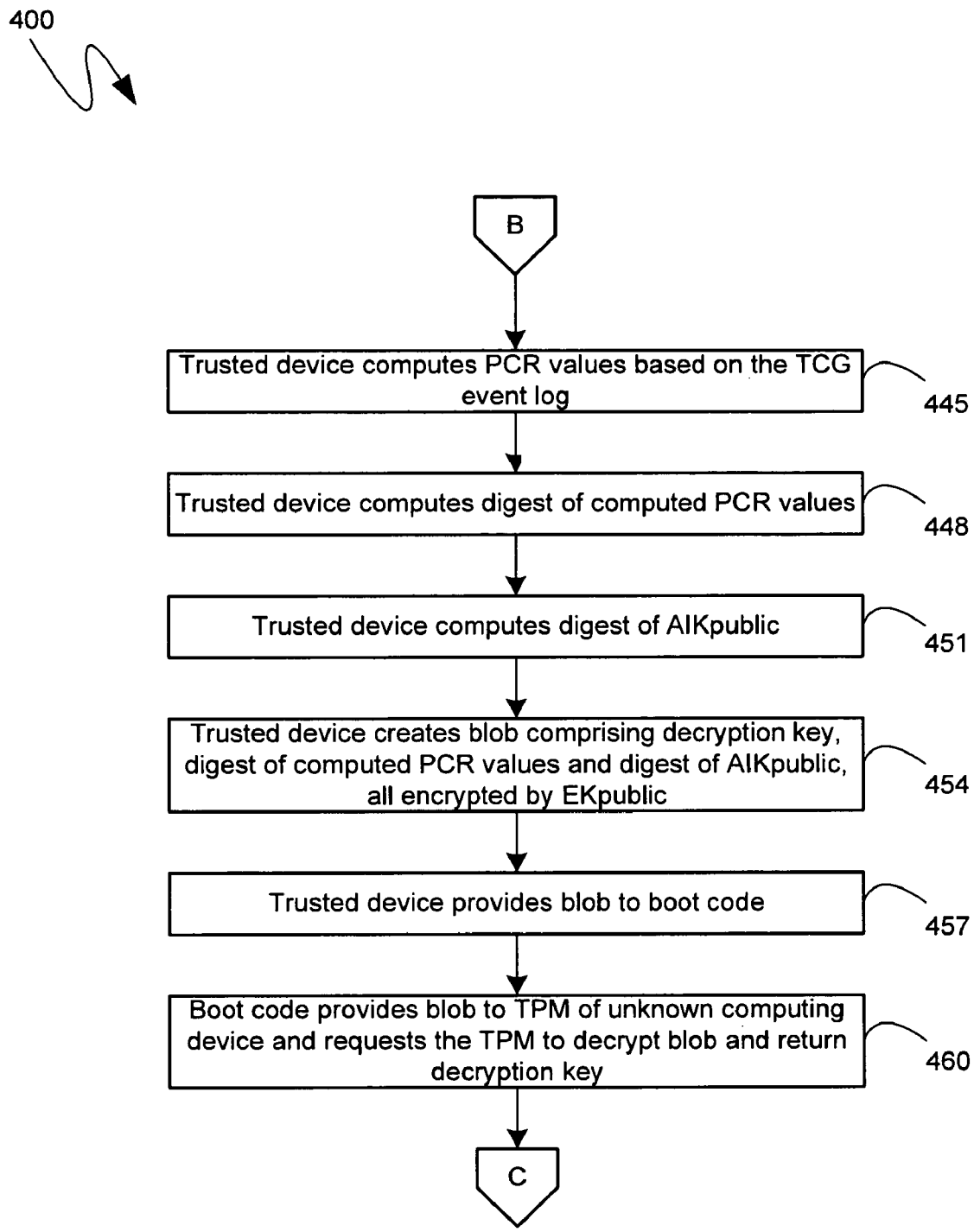

Turning to FIG. 4c, once the trusted device has determined, at step 439, that the TPM module claimed to be part of the unknown computing device is trustworthy, and once it has determined, at step 443, that the instructions or modules that are claimed to have been loaded or executed on the unknown computing device are acceptable, the trusted device can, at step 445, compute the PCR values that should be maintained within the PCRs of the TPM on the unknown computing device if the instructions or modules listed in the TCG event log really were executed or loaded on the unknown computing device in the order indicated. Because, as indicated previously, such values may be large, the trusted device can subsequently, at step 448, compute a digest of those values that can be limited in size. The trusted device can also compute a digest of AIKpublic, since such a key can likewise be quite large. As before, step 451 can occur prior to, or concurrently with, steps 445 and 448, and, thus, it is illustrated as occurring after strictly for simplicity of description.

Once the trusted device has completed steps 448 and 451, it can create a "blob" at step 545 that comprises a decryption key for the encrypted volume whose copying to the unknown computing device commenced at step 409, the digest of the PCR values calculated at step 448 and the digest of AIKpublic that was calculated at step 451, all of which can be encrypted by the EKpublic, which can have been obtained from the EKcertificate received at step 436. The blob created at step 454 can then be transferred, at step 457, to the boot code executing on the unknown computing device.

When the boot code executing on the unknown computing device receives the blob sent by the trusted device at step 457, it can, at step 460, provide that encrypted blob to the TPM of the unknown computing device and request that the TPM return to the boot code the decryption key. As indicated previously, and as will be known by those skilled in the art, the blob created at step 454 can be analogous to an AIK activation blob and, consequently, the request, at step 460, by the boot code executing on the unknown computing device can be a request that can be responded to by any TPM module and need not require a specialized TPM module or additional modifications thereto.

Figure 4D:
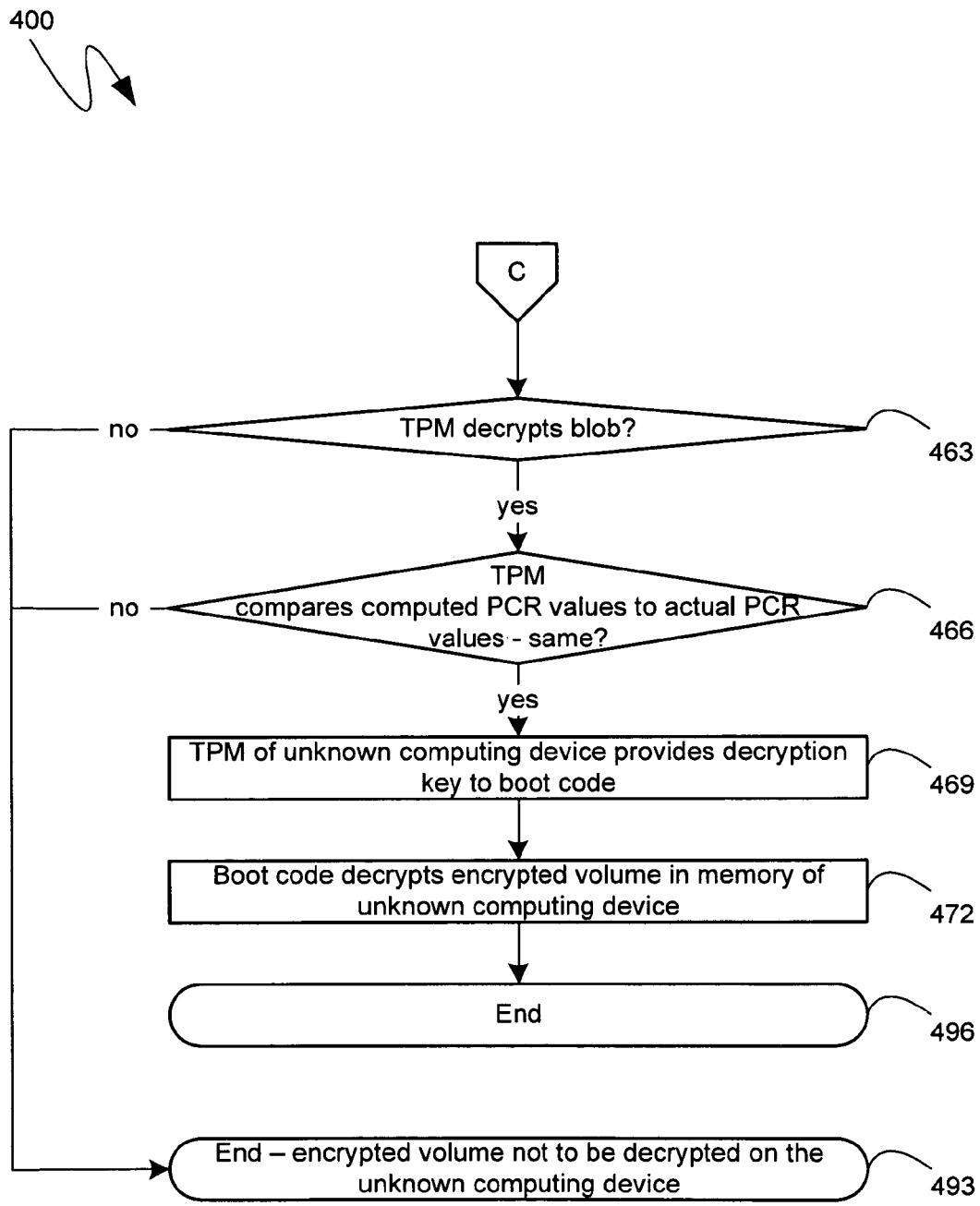

Initially, upon receiving the blob from the boot code executing on the unknown computing device, the TPM can attempt, at step 463 of FIG. 4d, to decrypt the blob using the EKprivate that the TPM should have possession of if the EKcertificate previously provided at step 433 was authentic. If the TPM is not able to, at step 463, decrypt the blob that was provided to it at step 460, then the processing can end at step 493 with a determination that the encrypted volume should not be decrypted on the unknown computing device. However, if at step 463, the TPM is able to decrypt the blob, it can subsequently, at step 466, compare the expected PCR values that were computed by the trusted device at step 445 based on the information contained in the TCG event log to the actual PCR values maintained by the TPM. More specifically, the comparison at step 466 can be between the digest of the expected PCR values that was computed by the trusted device at step 448 and the digest of the actual PCR values maintained by the TPM. If the values compared at step 466 are not equal, then the unknown computing device can have instructions that were executed or modules that were loaded that were not within the TCG event log that was provided to the trusted device at step 436 nor found to be acceptable by the trusted device at step 442. Consequently, if, at step 466, the compared values are not equal, processing can end, at step 493, with a determination that the encrypted volume should not be decrypted on the unknown computing device. However, if the compared values of step 466 are found to be equal, then, at step 469 the TPM of the unknown computing device can provide, to the boot code executing on the unknown computing device, the decryption key.

With the decryption key, received at step 469, the boot code executing on the unknown computing device can decrypt, at step 472, the encrypted volume whose copying to the unknown computing device commenced at step 409. Subsequently, after the encrypted volume is decrypted, the boot code executing on the unknown computing device can turn over operation of the unknown computing device to one or more of the software applications, operating systems or other components that are stored with the, now decrypted, encrypted volume. The relevant processing can then end at step 496.

Figure 5:
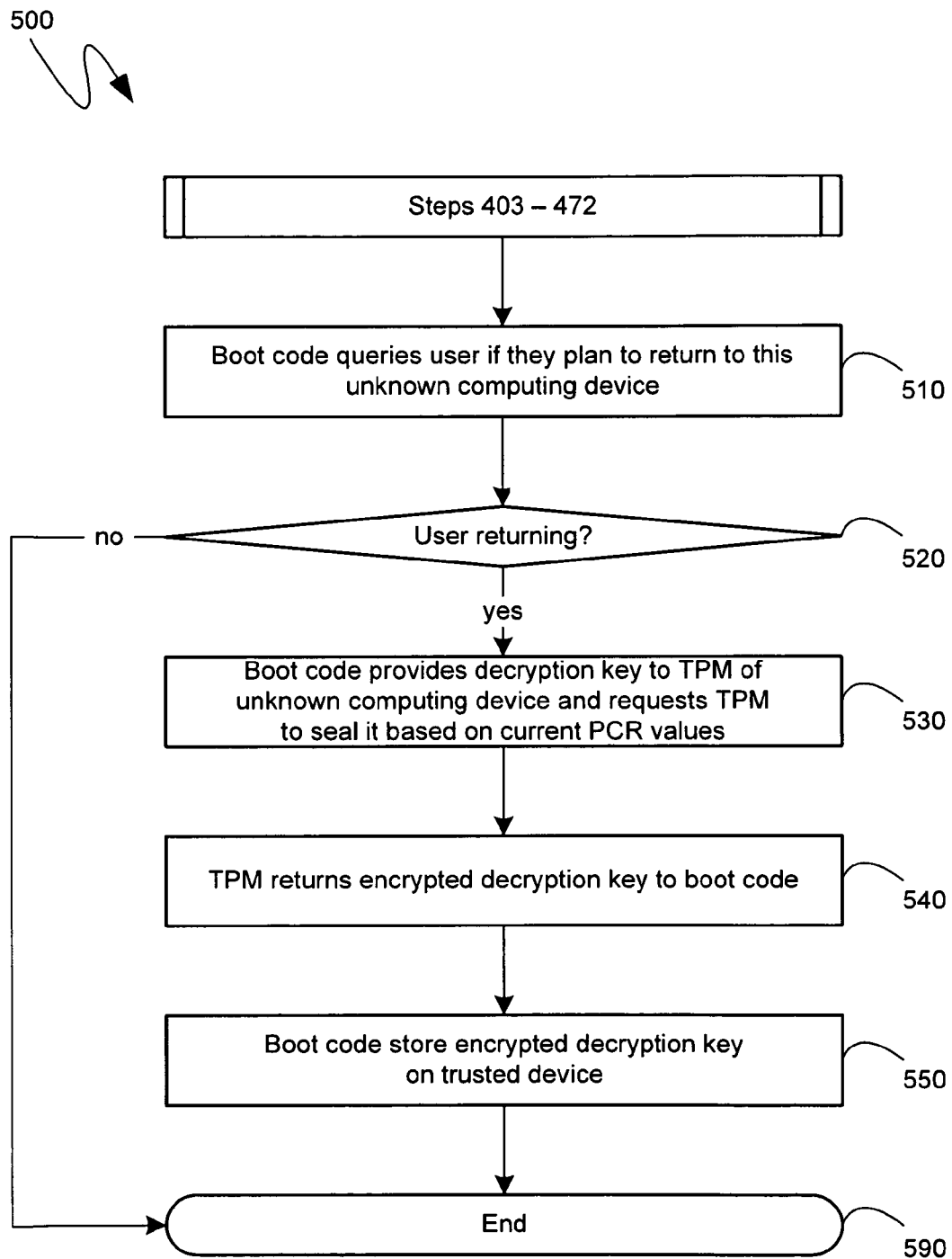
FIG. 5 is a flow diagram of an exemplary optimization to a trust validation of an unknown platform.

Turning to FIG. 5, an optimization to the above described mechanisms is illustrated with reference to flow diagram 500. In particular, as will be described further below, the mechanisms of flow diagram 500 can utilize the process of sealing to enable greater efficiencies should a user, such as the user 210, return to the same unknown computing device, such as the unknown computing device 250. As will be known by those skilled in the art, the process of sealing causes a secret to be retained by a TPM and released only if the values of one or more of the PCRs of the TPM at that subsequent release time match the values of those same PCRs at the time that the secret was provided to the TPM and "sealed" by the TPM.

Consequently, if the user expects to return to the unknown computing device, the decryption key, such as decryption key 245, can simply be sealed by the TPM 150 of the unknown computing device 250 to the current PCR values, which have already been found, by the trusted device, to represent an acceptable state of the unknown computing device. Subsequently, when the user returns to the same unknown computing device 250, rather than repeating the above steps, the TPM 150 of the unknown computing device can be asked to unseal the decryption key 245 by the boot code, such as boot code 241. If the PCR values are the same at that time, the decryption key 245 can be unsealed by the TPM 150 and provided to the boot code 241 without resort to the above described mechanisms, thereby rendering the provision of such a decryption key more efficient.

Turning to flow diagram 500, as can be seen, initially, steps 403 through 472 can be performed, such as in the manner described in detail above. Subsequently, after the decryption key has been provided to the boot code at step 469, the boot code can cause the unknown computing device to query the user as to the user's plans to return to that same unknown computing device. If, at step 520, an indication is received from the user that they do not plan on returning to the unknown computing device, then the relevant processing can end at step 590, as shown.

However, if at step 520, the user indicates that they do plan to return to the same unknown computing device, then, at step 530, the boot code executing on the unknown computing device, and now in possession of the decryption key, can request that the TPM of the unknown computing device seal the decryption key based on one or more of the current values of the PCRs of the TPM. The TPM can then return, to the boot code executing on the unknown computing device, an encrypted version of the decryption key at step 540. Specifically, as will be known by those skilled in the art, the encrypted decryption key returned by the TPM at step 540 can be encrypted by EKpublic, or another key such that only the TPM of the unknown computing device can decrypt it, since only that TPM should possess the required EKprivate.

After receiving the encrypted decryption key at step 540, the boot code can, at step 550, store the encrypted decryption key on the trusted device with an indication of the unknown computing device with which it is associated. The relevant processing can then end at step 590. Although not shown in flow diagram 500, subsequently, when the user returns to the unknown computing device, and communicationally couples the unknown computing device to the trusted device, the boot code copied from the trusted device and executing on the unknown computing device can check if the trusted device has stored within it an encrypted version of the decryption key associated with the unknown computing device. If such an encrypted version exists, the boot code can obtain it from the trusted device and provide it to the TPM of the unknown computing device and request that TPM unseal the decryption key. If the PCR values maintained by the TPM of the unknown computing device are the same, at that time, as they were at step 530, then the TPM can unseal the decryption key and provide it to the boot code executing on the unknown computing device. The boot code can then decrypt the encrypted volume on the unknown computing device without performing all of the above described steps, and, can, thereby, provide user access to the applications, operating systems or other components stored within the encrypted volume more efficiently.

As can be seen from the above descriptions, trust validation mechanisms can be performed with respect to an unknown computing device by a trusted device communicationally coupled to it, thereby enabling the user of the unknown computing device to securely access protected applications, operating systems or other components. In view of the many possible variations of the subject matter described herein, we claim as our invention all such embodiments as may come within the scope of the following claims and equivalents thereto.

We claim:

1. A method of booting an untrusted computing device comprising a trusted platform module, the method comprising the steps of:

requesting, from the trusted platform module, a first certificate comprising a first key, the first certificate being signed by a certificate authority acting as a root of trust anchor;

obtaining, from a memory of the untrusted computing device, an unencrypted log listing all computer-executable instructions then executed on the untrusted computing device and all modules then loaded on the untrusted computing device;

providing, prior to the execution of an operating system on the untrusted computing device, the first certificate and the unencrypted log to a trusted peripheral device communicationally coupled to the untrusted computing device, the trusted peripheral device being portable by a user of the untrusted computing device;

receiving, from the trusted peripheral device, a first set of encrypted data encrypted with the first key, the first set of encrypted data comprising a second key utilizable to decrypt an encrypted volume that comprises the operating system and at least one value expected by the trusted peripheral device to be stored within at least one platform configuration register of the trusted platform module given the unencrypted log;

providing the first set of encrypted data to the trusted platform module;

receiving, from the trusted platform module, the second key only if the at least one value expected to be stored within the at least one platform configuration register of the trusted platform module is, in fact, stored within the at least one platform configuration register of the trusted platform module;

decrypting, using the second key, the encrypted volume on the untrusted computing device prior to the execution of the operating system on the untrusted computing device; and executing the operating system on the untrusted computing device from the decrypted encrypted volume.

2. The method of claim 1, wherein the trusted peripheral device is a portable storage device.

3. The method of claim 1, wherein the trusted peripheral device comprises at least one computing device remote from the untrusted computing device and communicationally coupled to the untrusted computing device through a network.

4. The method of claim 1, wherein the encrypted volume was copied to the untrusted computing device from the trusted peripheral device.

5. The method of claim 1 further comprising the steps of causing the untrusted computing device to request, from a user, an owner authorization of the untrusted computing device.

6. The method of claim 1 further comprising the steps of:
requesting that the trusted platform module seal the second key based on at least one value currently existing in at least one platform configuration register of the trusted platform module;
receiving, from the trusted platform module, an encrypted version of the second key; and
storing the encrypted version of the second key on the trusted device.

7. The method of claim 1 further comprising the steps of:
checking if the trusted peripheral device comprises an encrypted version of the second key that is sealed based on at least one value of at least one platform configuration register of the trusted platform module of the untrusted computing device;
and, if the trusted peripheral device comprises the encrypted version of the second key, requesting the trusted platform module of the untrusted computing device to unseal the encrypted version of the second key.

8. A method of booting an untrusted computing device comprising a trusted platform module, the method comprising the steps of:
receiving, from the untrusted computing device, at a trusted peripheral device communicationally coupled to the untrusted computing device, the trusted peripheral device being portable by a user of the untrusted computing device, prior to the execution of an operating system on the untrusted computing device, a first certificate comprising a first key, and an unencrypted log listing all computer-executable instructions then executed on the untrusted computing device and all modules then loaded on the untrusted computing device, the first certificate being signed by a certificate authority acting as a root of trust anchor;

determining, on the trusted peripheral device, if the first certificate is signed by a certificate authority that is a trusted root authority;

determining, on the trusted peripheral device, if the unencrypted log indicates that the untrusted computing device is in an acceptable state; and if the first certificate is signed by the certificate authority that is the trusted root authority, and if the unencrypted log indicates that the untrusted computing device is in an acceptable state, encrypting, on the trusted peripheral device, with the first key, a first set of data comprising a second key utilizable to decrypt an encrypted volume that comprises the operating system and at least one value expected to be stored within at least one platform configuration register of the trusted platform module given the unencrypted log; and providing, from the trusted peripheral device to the untrusted computing device, prior to the execution of the operating system on the untrusted computing device, the encrypted first set of data such that the trusted platform module will only provide access to the second key if the at least one value expected to be stored within the at least one platform configuration register of the trusted platform module is, in fact, stored within the at least one platform configuration register of the trusted platform module.

9. The method of claim 8, wherein the steps are performed by a portable storage device.

10. The method of claim 8, wherein the steps are performed by at least one computing device remote from the untrusted computing device and communicationally coupled to the untrusted computing device through a network.

11. The method of claim 8, wherein the step of determining if the log indicates that the untrusted computing device is in an acceptable state comprises determining if all entries in the log are contained within a whitelist of known good items.

12. The method of claim 8, wherein the step of determining if the log indicates that the untrusted computing device is in an acceptable state comprises determining if any entries in the log are contained within a blacklist of known malicious items.

13. The method of claim 8 further comprising the steps of storing and associating with the untrusted computing device a version of the second key encrypted by the trusted platform module of the untrusted computing device.

14. A peripheral device that is portable by a user of an untrusted computing device, the portable peripheral device comprising a processing unit and a non-volatile storage the non-volatile storage comprising a listing of trusted root certificate authorities, an encrypted volume, a decryption key for decrypting the encrypted volume, and boot code for executing on the untrusted computing device, wherein the boot code comprises computer-executable instructions for performing steps comprising:
requesting, from a trusted platform module on the untrusted computing device, a first certificate comprising a first key, the first certificate being signed by a certificate authority acting as a root of trust anchor;
obtaining, from a memory of the untrusted computing device, an unencrypted log listing all computer-executable instructions then executed on the untrusted computing device and all modules then loaded on the untrusted computing device;
providing, prior to the execution of an operating system on the untrusted computing device, the first certificate and the unencrypted log to the portable peripheral device;
receiving, from the portable peripheral device a first set of encrypted data encrypted with the first key, the first set of encrypted data comprising the decryption key and at least one value expected by the portable peripheral device to be stored within of east one platform configuration register of the trusted platform module given the unencrypted log;

providing the first set of encrypted data to the trusted platform module;

receiving, from the trusted platform module, the decryption key only if the at least one value expected to be stored within the least one platform configuration register of the trusted platform module is, in fact, stored within the at least one platform configuration register of the trusted platform module;

decrypting, using the decryption key, the encrypted volume on the untrusted computing device prior to the execution of the operating system on the untrusted computing device; and executing the operating system on the untrusted computing device from the decrypted encrypted volume.

15. The portable peripheral device of claim 14, wherein the boot code further comprises computer-executable instructions for performing steps comprising:

requesting that the trusted platform module seal the decryption key based on at least one value currently existing in at least one platform configuration register of the trusted platform module;

receiving, from the trusted platform module, an encrypted version of the decryption key; and storing the encrypted version of the decryption key on the portable peripheral device.

16. The portable peripheral device of claim 14, wherein the boot code further comprises computer-executable instructions for performing steps comprising: checking if the portable peripheral device comprises an encrypted version of the decryption key that is sealed based on at least one value of at least one platform configuration register of the trusted platform module of the untrusted computing device; and, if the portable peripheral device comprises the encrypted version of the decryption key, requesting the trusted platform module of the untrusted computing device to unseal the encrypted version of the decryption key.

17. A peripheral device that is portable a user of an untrusted computing device, the portable peripheral device comprising a processing unit and a non-volatile storage, the non-volatile storage comprising a listing of trusted root certificate authorities, either a blacklist of known malicious items or a whitelist of known good items, an encrypted volume a decryption key for decrypting the encrypted volume, and boot code for executing on the untrusted computing device, wherein the processing unit performs steps comprising:

receiving, from the untrusted computing device, prior to the execution of an operating system on the untrusted computing device, a first certificate comprising a first key, and an unencrypted log listing all computer-executable instructions then executed on the untrusted computing device and all modules then loaded on the untrusted computing device, the first certificate being signed by a certificate authority acting as a root of trust anchor;

determining, with reference to the listing of trusted root certificate authorities, if the first certificate is signed by a certificate authority that is a trusted root authority;

determining, with reference to the at least one of the blacklist and the whitelist, if the unencrypted log indicates that the untrusted computing device is in an acceptable state; and if the first certificate is signed by the certificate authority that is the trusted root authority, and if the unencrypted log indicates that the untrusted computing device is in an acceptable state, encrypting, with the first key, a first set of data comprising the decryption key and at least one value expected to be stored within at least one platform configuration register of a trusted platform module of the untrusted computing device given the log such that the trusted platform module will only allow access to the decryption key if the at least one value expected to be stored within the at lest one platform configuration register of the trusted platform module is, in fact, stored within the at least one platform configuration register of the trusted platform module; and providing, to the untrusted computing device, prior to the execution of the operating system on the untrusted computing device, the encrypted first set of data.

18. The portable peripheral device of claim 17, wherein the processing unit, in performing the step of determining if the log indicates that the untrusted computing device is in an acceptable state, further performs steps comprising determining if all entries in the log are contained within the whitelist.

19. The portable peripheral device of claim 17, wherein the processing unit, in performing the step of determining if the log indicates that the untrusted computing device is in an acceptable state, further performs steps comprising determining if any entries in the log are contained within the blacklist.

* * * * *

UNITED STATES PATENT AND TRADEMARK OFFICE
CERTIFICATE OF CORRECTION

| | | |
|---|---|---|
| PATENT NO. | : 8,127,146 B2 | Page 1 of 1 |
| APPLICATION NO. | : 12/241496 | |
| DATED | : February 28, 2012 | |
| INVENTOR(S) | : Thom et al. | |

It is certified that error appears in the above-identified patent and that said Letters Patent is hereby corrected as shown below:

In column 18, line 47, in Claim 14, delete "storage" and insert -- storage, --, therefor.

In column 19, line 3, in Claim 14, delete "of east" and insert -- at least --, therefor.

In column 19, line 10, in Claim 14, delete "least" and insert -- at least --, therefor.

In column 19, line 42, in Claim 17, delete "a" and insert -- by a --, therefor.

In column 20, line 1, in Claim 17, delete "ume" and insert -- ume, --, therefor.

In column 20, line 30, in Claim 17, delete "at lest" and insert -- at least --, therefor.

Signed and Sealed this
Ninth Day of October, 2012

David J. Kappos
*Director of the United States Patent and Trademark Office*